United States Patent Office 2,929,774
Patented Mar. 22, 1960

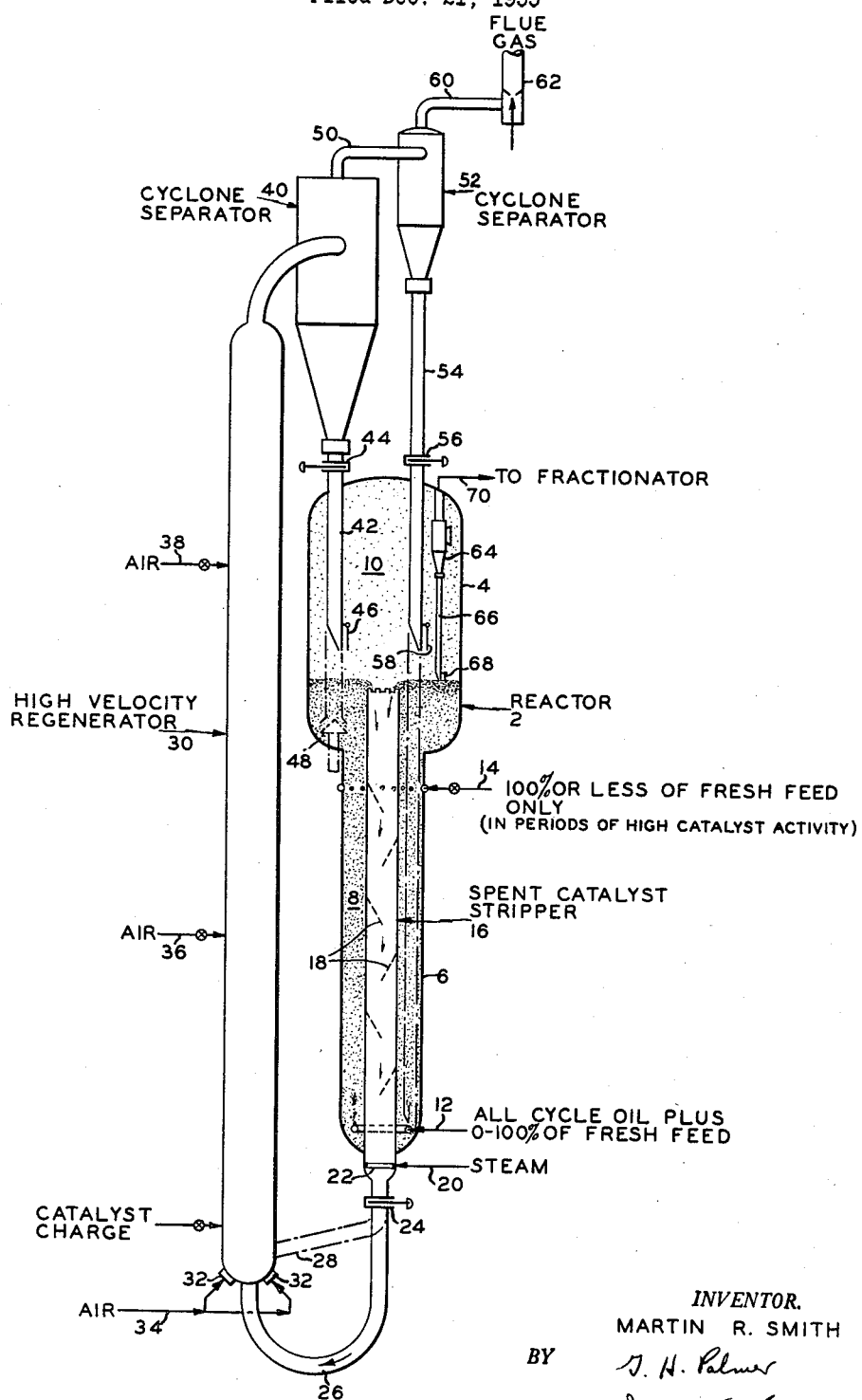

2,929,774

CONVERSION PROCESS AND APPARATUS THEREFOR

Martin R. Smith, Glen Ridge, N.J., assignor to The M. W. Kellogg Company, Jersey City, N.J., a corporation of Delaware Application December 21, 1955, Serial No. 554,495

19 Claims. (Cl. 208—113)

This invention relates to a novel process and apparatus for effecting chemical conversions and more particularly it relates to a method and means for catalytically cracking high boiling hydrocarbons to gasoline of high antiknock quality.

In accordance with the present invention, a process is provided which comprises contacting a vaporous hydrocarbon with a dense fluidized bed of finely divided catalytic material under suitable conversion conditions in a reaction zone, whereby a reaction product is produced and the catalyst is contaminated with carbonaceous material and volatile hydrocarbons. A portion of the contaminated catalyst is withdrawn from the dense bed in the reaction zone and passed downwardly, either in the form of a dense mass or a cascade, in contact with a gasiform stripping agent in a stripping zone in order to strip volatile hydrocarbon material from the contaminated catalyst. The stripped catalyst is then transferred to a regeneration zone, which is preferably situated side-by-side with the reaction zone, and the catalyst is passed upwardly through the regeneration zone as a suspension in a regenerating gas. The regenerated catalyst passes from the top of the regeneration zone into a suitable separating means, such as a cyclone separator, in which the regenerated catalyst is separated from the flue gas. The regenerated catalyst is then transferred from the cyclone separator into the reactor by means of a dipleg which may terminate in the reactor at a point above or below the surface of the dense phase of catalyst therein. If desired, two or more cyclones may be used in series to separate the flue gas from the regenerated catalyst and the diplegs from all of the cyclones may extend into the reactor in the manner previously described.

The apparatus of the present invention includes a combination of a high velocity "up-flow" regenerator and a "down-flow" reactor. The reactor, however, is elongated in shape and the diameter of the lower portion thereof is considerably reduced compared to the diameter of conventional units. The upper portion of the reactor may contain from about 30 to 65 percent of the catalyst bed required for the reaction and is sized for conventional low velocity. The spent catalyst stripper is located in the reactor and is of conventional diameter. However, the present reactor design permits the stripper to be of considerably greater length than in conventional units, thereby affording greater time for stripping and a higher length to diameter ratio, in order to reduce top to bottom mixing and thereby more closely approach countercurrent contact of the stripping gas with the catalyst.

Referring to the accompanying drawing, which is a diagrammatic illustration of apparatus in elevation, the reactor 2 includes an enlarged portion 4 and a lower elongated portion of reduced diameter 6. The reactor contains a dense fluidized bed of catalyst 8 having the dilute phase 10 in the reactor free space. Feed may be introduced into the reactor at a plurality of points; for example, all cycle oil mixed with up to 100 percent of the fresh feed may be introduced into the reactor through the line 12, which may be a ring composed of 20 to 50 injection pipes or nozzles, and in periods of high catalyst activity, up to 100 percent of the fresh feed may be introduced into the reactor catalyst bed through the line 14, which connects to a multiple nozzle around the periphery of the reactor or to a distribution ring within the annular reactor. Spent catalyst from the fluidized bed 8 overflows into the spent catalyst stripper 16 and cascades downwardly over the perforated baffles 18. Steam or other stripping gas is introduced through the line 20 which connects to the distribution ring 22 in the bottom of the stripper.

The flow of the spent catalyst from the bottom of the stripper 16 is controlled by means of the valve 24, which may be of the slide or plug type, and, after passing through the valve, the catalyst is transferred through the U bend 26 or through the alternate transfer line 28 into the bottom of the high velocity regenerator 30. The high velocity regenerator is provided with a plurality of nozzles 32 at the bottom thereof, and the inlet line 34 connects to the nozzles for the introduction of a regenerating gas into the bottom of the regenerator. This regenerating gas is usually air, and secondary air is introduced into the regenerator through the lines 36 and 38, if desired.

The suspension of regenerated catalyst in flue gas is discharged from the top of the regenerator into the first stage cyclone separator 40, which may be more than one unit in parallel, in which the flue gas is separated from the catalyst, the catalyst being passed into the reactor through the combination dipleg-standpipe 42, control of the catalyst level in the standpipe being regulated by the external slide valve 44 or the internal plug valve 48. If an external slide valve is used, a "flapper" or a "trickle" valve 46 will also be used at the terminal point of the standpipe. The alternate construction is shown in phantom in which the internal plug valve 48 is below the surface of the dense phase in the reactor and replaces the "trickle" valve, but not the external slide valve.

Flue gas and some entrained catalyst pass from the first stage cyclone or cyclones 40 through the conduit or conduits 50 into the second stage cyclone or cyclones 52 from which the remaining catalyst is returned to the reactor through the combination dipleg-standpipe 54, which may be equipped with the external slide valve 56 and/or an internal plug valve similar to the plug valve 48. When an external slide valve is used, a "flapper" or "trickle" valve 58 will also be used. Alternatively, the dipleg-standpipe 54 may be extended to the bottom of the elongated portion 6 of the reactor thus insuring that some regenerated catalyst will contact the feed in the high velocity portion of the reactor. Flue gas passes from the second stage cyclone 52 through the conduit 60 to the stack 62.

Reaction products are withdrawn from the reactor through the cyclone 64 having the dipleg 66 thereon and the "flapper" or "trickle" valve 68 at the bottom of the dipleg. The reaction products pass from the cyclone through the line 70 from which they are transferred to a primary fractionator and recovery system, not shown.

The flexibility of the operation in the regenerator is increased by injecting portions of the combustion air at various points along the length of the regenerator. This serves to distribute the heat liberation load and affords some control of catalyst density and holdup in the regenerator.

Similarly, flexibility is increased on the reactor side by the provision of the plurality of points for fresh feed entry. In periods of high catalyst activity, all or any desired portion of the fresh feed can be diverted to an upper feed entry point while the dispersion steam and cycle oil enter the bottom of the reactor at all times in order to afford fluidizing means. Thus, the construction of the present invention provides a means for compensating for declining or changing catalyst activity with essentially constant reactor bed height and with a high location of stripper entry ports.

Tubular cooling means or a feed preheating means may be built into the up-flow regenerator if desired and this addition permits reduction of the catalyst to oil ratio and a higher feed temperature, both of which tend to decrease coke production and consequently the size of the stripper and the regenerator. This addition also permits more freedom in setting the temperature and recycle ratio on the reactor side at more nearly the optimum values.

The process of the present invention is particularly applicable to the catalytic cracking of high boiling hydrocarbons, such as residual oils, reduced crudes, gas oils and the like, using suitable cracking catalysts which may be a mixture of a siliceous material containing about 75 to 99 percent silica with the remainder being any one or more suitable materials such as alumina, boria, magnesia, zirconia and the like.

The cracking reaction is effected at a temperature of about 800 to 1025° F. preferably about 850 to 975° F. The pressure employed is usually about 1 atmosphere to 50 p.s.i.g. preferably about 5 to 25 p.s.i.g. The weight space velocity, measured as pounds of oil charged to the reaction zone per pound of catalyst present therein, is about 0.25 to about 10, preferably about 0.5 to 5. The relative rate of catalyst to oil, on a weight basis, varies from about 2 to 30, although in conventional practice, the catalyst to oil ratio is about 5 to 15, as it is desired to utilize the heat of combustion in the regeneration zone for the endothermic cracking reactions and to maintain a desired level of catalyst activity in the reaction zone. The superficial linear velocity in the high velocity portion of the reactor, i.e., the smaller and annular portion of the reactor, may be between about 1 and about 6 feet per second and the bed density may be between about 40 and about 15 pounds per cubic foot while in the upper, or lower velocity portion of the reactor, the superficial linear velocity may be between about 1.5 and about 2.5 feet per second and the bed density may be between about 40 and about 25 pounds per cubic foot.

The spent catalyst withdrawn from the reactor is stripped at a temperature falling within the same range as the reaction temperature although the stripping temperature may vary from the reaction temperature by using a gasiform stripping agent having a higher or lower temperature than that existing in the reaction zone. The gasiform stripping agent can be steam, flue gas or a normally gaseous hydrocarbon such as methane, ethane, propane and the like, or mixtures thereof.

The length to diameter ratio of the high velocity annular portion of the reactor may be in the range of about 5 to 35 while that of the low velocity annular portion of the reactor may be between about 1.0 to 2.5, and that of the stripper may be between about 4 to 7.

The spent catalyst is transported through the high velocity regenerator as a suspension in regenerating gas, such as air, at a superficial linear velocity of about 3 to 8 feet per second, the suspension in the regenerator having a density of about 10 to 25 pounds per cubic foot. The length to diameter ratio of the regenerator may be in the range of about 4 to 11. The pressure in the regenerator may be in the range of about 7 to 25 p.s.i.g. and the temperature may be in the range of about 1000 to 1150° F. preferably about 1075 to 1140° F.

The invention will be further illustrated by reference to the following specific example which shows the operating conditions suitable for a fluid catalytic cracking system utilizing the unitary reactor-regenerator design of the accompanying drawing and adapted to process 10,000 barrels per day of heavy gas oil, i.e. an Abadan wax distillate feed having an A.P.I. gravity of 23.2°, coke=5.4 weight percent, at a throughput ratio of 1.35 and a conversion of 55 percent.

EXAMPLE 1

Table I

Reactor:
| | |
|---|---|
| Temperature, °F | 930. |
| Space velocity | 3.0 lbs. total feed/hr./lb. catalyst in reactor. |
| Catalyst: oil ratio | 13.5 on fresh feed, 10.0 on total feed. |
| Pressure | 10 p.s.i.g. |
| Bed density | 16 lbs./cu. ft. (min.) in lower section; 32 lbs./cu. ft. (min.) in upper section. |
| Bed velocity (high velocity section) | 1 ft./sec. (min.), 6 ft./sec. (max.). |
| Bed velocity (low velocity section) | 2.0 ft./sec. |
| Bed pressure drop | 11 p.s.i. |
| Inlet line velocity | 100 ft./sec. (max.). |
| Outlet line velocity | 100 ft./sec. (max.). |
| Catalyst bed (weight) | 30 tons. |

Catalyst bed, L/D:
(D=11′ 4″)—(high velocity $$\text{section})-(\text{annular})=\frac{45}{1.3}=35$$

(D=15′ 7″)—(low velocity $$\text{section})-(\text{annular})=\frac{7.2}{3.5}=2.1$$

Spent Catalyst Stripper (D=8′ 9″):
| | |
|---|---|
| L/D ratio | 6.6. |
| Steam rate | 2.0–5.0 lbs. steam/1000 lbs. catalyst circulated. |

Regenerator (D=11′ 1″, L=105′):
| | |
|---|---|
| Temperature, °F | 1075. |
| Catalyst density | 15 lbs./cu. ft. |
| Catalyst velocity | 6 ft./sec. |
| Catalyst holdup, tons | 76. |
| L/D ratio | 9.5. |

Transfer Line System:
| | |
|---|---|
| First stage standpipe catalyst density | 30 lbs./cu. ft. |
| First stage standpipe catalyst pressure head | 14 p.s.i. |
| First stage standpipe catalyst velocity (average) | 6 ft./sec. |
| First stage standpipe valve pressure drop | 3 p.s.i. |
| Second stage standpipe catalyst density | 20 lbs./cu. ft. |
| Second stage standpipe catalyst pressure head | 14.3 p.s.i. |
| Second stage standpipe catalyst velocity (average) | 6 ft./sec. |
| Second stage standpipe valve pressure drop | 3 p.s.i. |

In one preferred embodiment of the invention, all the cyclone diplegs would discharge through "trickle" valves into a common hopper supported atop the reactor. Two standpipes would then extend from conical bottoms of the hopper through the top of the reactor to the bottom of the high velocity section of the reactor, the flow rate at this point being controlled by plug valves.

From the foregoing, it is apparent that an appreciable reduction in waste vessel space, formerly used for grids, disengaging space, cyclone dipleg housing and settled catalyst, is achieved using the design of the present invention. Further, improved stripping and diminished coke formation results from the increased catalyst holding time in the stripper and the reduction of top to bottom mixing. There is also an increased catalyst contact efficiency, in both the reactor and the regenerator, due to the high velocity and/or the high length to diameter ratio which improve distribution and reduce channeling and back mixing. There is a partial countercurrent contact in the upper portion of the reactor between partially reacted products and clean regenerated catalyst which is beneficial. Further, the possibility of an accumulation of larger particles or unregenerated particles in the reactor bottom is reduced and the control of after-burning in the regenerator is facilitated. Quench water, which in conventional designs contributes to higher catalyst losses and the reduction of catalyst activity could be reduced or eliminated but quench steam connections would be included in conduits between successive stages of cyclones. Quench water in the bed and in the dilute phase of conventional units would be eliminated. Connections of quench steam, thermocouples, analyzers, etc. will be less of a mechanical problem than before.

It will be obvious to those skilled in the art that many modifications may be made within the scope of the present invention without departing from the spirit thereof, and the invention includes all such modifications.

I claim:

1. An improved cyclic process for employing finely divided solid catalytic material which comprises passing said finely divided catalyst with a hydrocarbon reactant upwardly through a first high velocity hydrocarbon conversion zone and then through a low velocity hydrocarbon conversion zone containing a relatively dense catalyst bed to convert said hydrocarbon into desired reaction products and contaminate the catalyst, separating finely divided catalyst from products of reaction in said low velocity hydrocarbon conversion zone, separating reaction products from said low velocity conversion zone, passing said separated finely divided catalyst downwardly from said low velocity hydrocarbon conversion zone through a stripping zone confined within said high velocity hydrocarbon conversion zone, separating finely divided stripped catalyst from the lower portion of said stripping zone and passing the same upwardly through a high velocity regeneration zone with a combustion gas to remove by combustion contaminants on the catalyst and produce flue gas containing entrained regenerated catalyst, thereafter separating regenerated catalyst from said flue gas and returning the regenerated catalyst to said hydrocarbon conversion zones.

2. An apparatus comprising in combination an enclosed vessel formed by a substantially vertical elongated cylindrical section terminating in an upper expanded cylindrical section of larger diameter than said elongated cylindrical section, a first cylindrical stripper conduit concentrically disposed within said vessel extending downwardly from said expanded section through said elongated cylindrical section, said first conduit being in open communication in the upper portion thereof with said expanded section, a second elongated substantially vertical cylindrical regenerator conduit positioned adjacent to said vessel and of substantially greater length than said vessel, means for connecting the lower portion of said stripper conduit with the lower portion of said regenerator conduit, a first separator means, a second separator means, means for connecting the upper portion of said regenerator conduit with said first separator means, means for connecting said first separator with said expanded cylindrical section, means for connecting said first separator with said second separator, means for connecting said second separator with the lower portion of said elongated cylindrical section, means for adding a hydrocarbon reactant to the lower portion and the upper portion of said elongated cylindrical section, means for removing reaction product from said expanded section, means for introducing stripping gas to the lower portion of said stripper conduit, means for introducing regeneration gas incrementally to said regeneration conduit, and means for removing flue gas from said second separator.

3. An improved conversion apparatus for converting a hydrocarbon reactant with a finely divided fluid catalyst to desired products and regeneration of contaminated catalyst which comprises an elongated substantially vertical reaction vessel adapted to provide a high velocity upwardly flowing hydrocarbon reaction chamber in the lower portion and a low velocity hydrocarbon reaction chamber in the upper portion of said vessel, a stripping chamber positioned within said vessel adapted to accept finely divided catalysts from said low velocity chamber for downward flow through said stripper to a point below the lower portion of said high velocity reaction chamber, an elongated regeneration chamber positioned adjacent to said vessel and adapted to receive finely divided catalyst from the lower portion of said stripping chamber for upward flow through said regeneration chamber as a high velocity suspension in regeneration gas, means for separating regenerated finely divided catalyst from flue gas, means for passing separated regenerated catalyst to said low velocity and said high velocity reaction chambers, means for passing a hydrocarbon reactant to the upper portion and the lower portion of said high velocity reaction chamber, means for recovering hydrocarbon products of reaction from said low velocity reaction chamber, and means for passing a stripping gas to the lower portion of said stripping chamber.

4. An apparatus comprising in combination an elongated hydrocarbon reactor chamber having a stripping chamber coaxially positioned within said reactor chamber, said reactor chamber adapted for a high velocity hydrocarbon-reactant-catalyst contact section in the lower portion and a low velocity hydrocarbon-reactant-catalyst contact section in the upper portion thereof, means for passing a hydrocarbon reactant to the upper and lower portions of said high velocity section, means for passing catalyst from said low velocity section of said reactor downwardly through said stripper in countercurrent contact with stripping gas passed upwardly therethrough, a transfer conduit for passing stripped catalyst from said stripping chamber to the lower portion of an elongated, substantially vertical regeneration chamber, means for passing catalyst upwardly through said regeneration chamber as a high velocity suspension in regeneration gas, a plurality of sequentially connected separator chambers positioned above said regeneration chamber and connected to the upper portion thereof adapted to separate regenerated catalyst from regeneration product gas and conduit means for passing a plurality of streams of regenerated catalyst to said hydrocarbon reaction zone.

5. A process which comprises passing at least part of a hydrocarbon reactant upwardly through a fluidized bed of finely divided catalytic material of lower bed density in the lower part than in the upper part in a reaction zone, withdrawing contaminated catalytic material from the top of said catalyst bed and passing said withdrawn catalyst downwardly as an elongated confined stream through a stripping zone in contact with a stripping gas, withdrawing stripped catalytic material from said stripping zone and passing the same to the lower portion of a regeneration zone, passing the stripped catalytic material admixed with regeneration gas upwardly through a high velocity upflow regeneration zone as a suspension, incrementally adding additional regeneration gas to the upflowing suspension in said regeneration zone, separating a portion of the regenerated catalytic material from regeneration gases discharged from the upper portion of said regeneration zone in a first separation zone, passing the catalyst from said first separating zone to the upper portion of the catalyst bed in said reaction zone, passing regeneration gases containing entrained catalyst from the first separation zone to a second separation zone, separating additional regenerated catalyst from regeneration gases in said second separation zone and passing the separated regenerated catalyst from said second separation zone to the lower portion of the catalyst bed in said reaction zone.

6. A catalytic cracking process which comprises contacting under conversion conditions a hydrocarbon reactant first with a high velocity and then a lower velocity upwardly flowing fluidized bed of cracking catalyst in a reaction zone thereby contaminating the catalyst, withdrawing a portion of contaminated catalyst from the top of the bed of catalyst in said reaction zone and passing said withdrawn catalyst downwardly as an elongated confined stream through said reaction zone in a stripping zone in contact with a stripping gas, withdrawing stripped catalyst from the bottom of the stripping zone and passing the same to the bottom of a regeneration zone, passing the stripped catalyst upwardly through said regeneration zone as a suspension in a regeneration gas under regenerating conditions, withdrawing regenerated catalyst and regeneration gases from the top of said regeneration zone, separating withdrawn regenerated catalyst into at least two separate confined streams, passing one of said regenerated catalyst streams to the upper portion of the bed of catalyst in said reaction zone and passing another of said regenerated catalyst streams to the lower portion of the catalyst bed in said reaction zone.

7. A process which comprises contacting a chemical reactant first with a high velocity and then a lower velocity upwardly flowing fluidized bed of finely divided catalytic material in an elongated reaction zone, thereby contaminating the catalyst, withdrawing a portion of the contaminated catalytic material from the top of said catalyst bed in the reaction zone and passing it downwardly through an elongated stripping zone within said reaction zone in contact with a stripping gas introduced to the lower portion thereof, transferring stripped catalytic material from the stripping zone to a regeneration zone, passing the stripped catalytic material upwardly through a regeneration zone as a high velocity suspension to which regeneration gas is incrementally added in the direction of flow, withdrawing regenerated catalytic material and regeneration gases from the top of said regenerator and passing the same to a first cyclone separation zone, separating a portion of the regenerated catalyst from the regeneration gases in said first separation zone and passing the separated catalyst to the upper portion of the catalyst bed in said reaction zone, passing regeneration gases and entrained catalyst from the first separation zone to a second cyclone separation zone, separating regenerated catalyst from regeneration gases in said second separation zone and passing separated catalyst from said second separation zone to the lower portion of said catalyst bed.

8. An apparatus comprising in combination an elongated substantially vertical reactor chamber having an open end stripper chamber coaxially positioned within and extending downwardly from the upper portion thereof through said reactor chamber, means for passing finely divided solid material from the upper portion of said reactor chamber into the top of said stripper chamber for downward flow therein, means for removing finely divided solid material from the bottom of said stripper chamber, conduit means for transferring the solid material from the bottom of said stripper chamber to the bottom of an elongated substantially vertical regenerator chamber positioned adjacent to said reactor chamber, means for passing finely divided solid material upwardly through said regenerator chamber, means for introducing gaseous material incrementally to said regeneration chamber, means for passing all of the finely divided solids and gas from the top of said regenerator chamber to a first separation chamber, means for passing separated solids from said first separation chamber to the upper portion of said reactor chamber, means for passing a gas containing entrained solids from the first separation chamber to a second separation chamber, means for separating solids from gas in said second separation chamber, and means for passing separated solids from said second separation chamber to the lower portion of said reaction chamber.

9. An apparatus comprising in combination an elongated reactor chamber of smaller diameter in the lower portion thereof than in the upper portion thereof, said reactor chamber having an open end stripping chamber concentrically positioned within and extending upwardly through said reactor chamber, means for introducing a hydrocarbon reactant to the upper and lower portion of said reactor chamber, means for passing finely divided solid material from the upper portion of said reactor chamber into the upper portion of said stripping chamber for downward flow therein, means for introducing a stripping gas to the lower portion of said stripping chamber for upward flow through said stripping chamber, a transfer conduit for passing solid material from the bottom of said stripping chamber into the lower portion of an elongated substantially vertical regeneration chamber, means for passing the solid material upwardly through said regeneration chamber as a suspension in a regeneration gas, a plurality of sequentially connected separator chambers connected to the top of said regeneration chamber for separating finely divided solids from regeneration gases, means for passing a portion of the separated solids from one of said separator chambers to the upper portion of said reactor chamber and means for passing another portion of separated solids to the lower portion of said reactor chamber.

10. A conversion process which comprises passing a first chemical reactant in contact with finely divided solid particles and passing the mixture upwardly through a first relatively high velocity contact zone and then through a contact zone of lower velocity than said first higher velocity contact zone, introducing a second chemical reactant into the upper portion of said high velocity contact zone for passage into said zone of lower velocity, separating products of reaction from said finely divided solids in said zone of lower velocity, passing said solids separated in said low velocity zone downwardly as an elongated confined stream in a stripping zone countercurrent to stripping gas introduced to the lower portion thereof, separating stripped finely divided solids from said stripping zone and passing the same through a regeneration zone as a relatively high velocity suspension in concurrent contact with regeneration gases, separating finely divided regenerated solids from said regeneration gases and returning a portion of said separated finely divided regenerated solids to the zone of lower velocity.

11. An improved hydrocarbon conversion process which comprises passing a hydrocarbon reactant and finely divided catalyst as a suspension upwardly through an elongated annular reaction zone to an enlarged reaction zone wherein a more dense catalyst bed is maintained under conditions to effect conversion to desired products, introducing additional reactant to said catalyst in the upper portion of said elongated annular reaction zone, separating products of reaction from said finely divided catalyst in said enlarged reaction zone, recovering reaction products from said reaction zone, passing finely divided catalyst from the upper portion of the catalyst in said enlarged reaction zone downwardly through an elongated confined stripping zone, said stripping zone being surrounded by said elongated annular reaction zone, passing finely divided catalyst from the lower portion of said stripping zone to the lower portion of an elongated high velocity upflow regeneration zone, passing finely divided catalyst with combustion gas as a high velocity stream upwardly through said regeneration zone under regeneration conditions to a separation zone above said enlarged reaction zone, separating regenerated catalyst from products of combustion in said separation zone and passing separated catalyst to said enlarged reaction zone.

12. A method for the conversion of hydrocarbons which comprises passing a first hydrocarbon reactant under conversion conditions in contact with finely divided catalyst upwardly through a first elongated relatively high velocity catalyst reaction zone and then through a second relatively low velocity catalyst reaction zone, introducing a second hydrocarbon reactant into the upper portion of said relatively high velocity catalyst reaction zone for passage upwardly through said second relatively low velocity reaction zone under conversion conditions thereby contaminating the catalyst, separating products of reaction from contaminated catalyst in said second relatively low velocity reaction zone, passing separated contaminated catalyst downwardly through an elongated stripping zone countercurrent to stripping gas introduced to the lower portion thereof, said stripping zone extending at least the length of the catalyst bed in said first and second reaction zones, withdrawing catalyst from the bottom of said stripping zone and passing the same to a regeneration zone, regenerating catalyst in said regeneration zone, withdrawing regenerated catalyst from said regeneration zone and passing a portion of said regenerated catalyst to the lower portion of said first relatively high velocity catalyst reaction zone.

13. The method of claim 12 in which the first hydrocarbon reactant is a cycle oil.

14. The method of claim 12 in which the second hydrocarbon reactant is fresh feed.

15. The method of claim 12 in which the first hydrocarbon reactant is fresh feed.

16. The method of claim 12 in which the second hydrocarbon feed is cycle oil.

17. The method of claim 12 in which the first and second hydrocarbon feed is a mixture of fresh feed and cycle oil.

18. A process which comprises contacting a chemical reactant with a fluidized bed of finely divided solid material in a reaction zone of higher bed density in the upper portion of the bed than in the lower portion of the bed, centrally withdrawing a portion of said solid material from the upper portion of said bed of higher density for downward flow through an elongated confined stripping zone within said reaction zone in countercurrent contact with a stripping gas introduced to the lower portion of said stripping zone, transferring stripped solid material from the bottom of said stripping zone to a regeneration zone, passing the stripped solid material admixed with at least a portion of the regeneration air upwardly through an elongated regeneration zone as a suspension under regenerating conditions to a separation zone, separating regenerated solid material from gas discharged from said regeneration zone in said separation zone and passing a portion of the separated regenerated solid material downwardly as an elongated confined stream to the bed of solids of highest density in said recation zone.

19. An apparatus comprising in combination an elongated substantially vertical reactor chamber of larger diameter in the upper portion than in the lower portion, a stripping chamber positioned within said reactor chamber extending upwardly therethrough into the upper portion of said reactor chamber of larger diameter, means for passing a suspension of finely divided solid material upwardly around said stripping chamber into the upper portion of said reactor chamber of larger diameter, means for passing finely divided solid material from the upper portion of said reactor chamber into the upper portion of said stripping chamber for downward passage therein, means for transferring finely divided solid material from the bottom of said stripper chamber to the bottom of an elongated regenerator chamber, means for passing the finely divided solid material upwardly through said regenerator chamber as a suspension in a regeneration gas, means for passing all of the regenerated catalyst from the top of said regeneration chamber to a solid material separation chamber positioned above said reactor chamber, means for separating finely divided solid material from said gas in said separation chamber and means for separately passing finely divided solid material downwardly into the upper and lower portion of said reactor chamber.

References Cited in the file of this patent

UNITED STATES PATENTS

| | | |
|---|---|---|
| 2,312,230 | Belchetz | Feb. 23, 1943 |
| 2,341,193 | Scheineman | Feb. 8, 1944 |
| 2,344,449 | Ogorzaly | Mar. 14, 1944 |
| 2,367,694 | Snuggs | Jan. 23, 1945 |
| 2,402,875 | Cornell | June 25, 1946 |
| 2,407,700 | Huff | Sept. 17, 1946 |
| 2,414,373 | Gerhold | Jan. 14, 1947 |
| 2,418,003 | Angell | Mar. 25, 1947 |
| 2,418,993 | Sweeney | Apr. 15, 1947 |
| 2,428,872 | Gunness | Oct. 14, 1947 |
| 2,428,873 | Gunness et al. | Oct. 14, 1947 |
| 2,433,726 | Angell | Dec. 30, 1947 |
| 2,439,582 | Scheineman | Apr. 13, 1948 |
| 2,446,678 | Voorhees | Aug. 10, 1948 |
| 2,455,915 | Borcherding | Dec. 14, 1948 |
| 2,457,232 | Hengstebeck | Dec. 28, 1948 |
| 2,488,029 | Scheineman | Nov. 15, 1949 |
| 2,498,552 | Kilgren et al. | Feb. 21, 1950 |
| 2,514,288 | Nicholson | July 4, 1950 |
| 2,536,254 | Beckberger | Jan. 2, 1951 |
| 2,606,863 | Rehbein | Aug. 12, 1952 |
| 2,629,684 | Leffler | Feb. 24, 1953 |
| 2,663,675 | Ewell | Dec. 22, 1953 |
| 2,671,102 | Jewell | Mar. 2, 1954 |
| 2,700,641 | Rehbein | Jan. 25, 1955 |
| 2,765,265 | Bourguet et al. | Oct. 2, 1956 |
| 2,766,185 | Pansing | Oct. 9, 1956 |